US009643557B1

(12) United States Patent
Newlands (10) Patent No.: US 9,643,557 B1
(45) Date of Patent: May 9, 2017

(54) MULTIFUNCTIONAL AIRBAG TRIGGERING SYSTEM

(71) Applicant: Paulo Roberto Jannotti Newlands, Rio de Janeiro (BR)

(72) Inventor: Paulo Roberto Jannotti Newlands, Rio de Janeiro (BR)

( * ) Notice: Subject to any disclaimer, the term of this patent is extended or adjusted under 35 U.S.C. 154(b) by 0 days.

(21) Appl. No.: 14/922,178

(22) Filed: Oct. 25, 2015

(51) Int. Cl.
| | | |
|---|---|---|
| B60R 22/00 | (2006.01) | |
| G08G 1/09 | (2006.01) | |
| H04M 11/04 | (2006.01) | |
| B60R 21/01 | (2006.01) | |
| B60Q 9/00 | (2006.01) | |
| B60R 21/00 | (2006.01) | |

(52) U.S. Cl.
CPC .............. B60R 21/01 (2013.01); B60Q 9/00 (2013.01); *B60R 2021/0027* (2013.01); *B60R 2021/01088* (2013.01)

(58) Field of Classification Search
USPC .......................... 701/45; 340/905; 455/404.2
See application file for complete search history.

(56) References Cited

U.S. PATENT DOCUMENTS

| | | | | |
|---|---|---|---|---|
| 2003/0139871 A1* | 7/2003 | Miller | .................... | G08G 1/162 701/96 |
| 2007/0053307 A1* | 3/2007 | Greene | ............... | H04L 12/1854 370/252 |
| 2007/0219695 A1* | 9/2007 | Chiu | ..................... | B60W 30/08 701/51 |
| 2009/0167513 A1* | 7/2009 | Hill | ........................ | G01S 5/0072 340/435 |
| 2009/0228172 A1* | 9/2009 | Markyvech | .......... | G01S 5/0072 701/36 |
| 2010/0194593 A1* | 8/2010 | Mays | ..................... | B60Q 5/006 340/905 |
| 2010/0198491 A1* | 8/2010 | Mays | ................... | B60W 30/09 701/124 |

(Continued)

FOREIGN PATENT DOCUMENTS

| | | |
|---|---|---|
| CN | 101804800 A | 8/2010 |
| CN | 101817331 A | 9/2010 |

(Continued)

*Primary Examiner* — Tyler Paige
(74) *Attorney, Agent, or Firm* — Malloy & Malloy, P.L.

(57) ABSTRACT

A multifunctional airbag triggering system embedded to any kind of vehicle and coupled to a communication network, comprising: a method of activating the inflation of vehicular airbags jointly with the broadcasting of a warning alert to all correspondent vehicles adhered to the system, whenever that precautionary measures to mitigate possible undesirable consequences arisen from a sudden vehicular accident of major severity are needed; electronic means for the instant broadcasting of a general alert announcing that an urgency is presently in force somewhere in the vicinity, allowing so that all incoming drivers should be ready to avert sequential collisions somewhere ahead with an affected vehicle much before it can be seen, giving so time enough to the oncoming drivers for a safe deceleration; a large, exclusive and dedicated broadcasting network instantly created between drivers and authorities through which a warning alert is sent simultaneously with the occurrence of a vehicular accident.

20 Claims, 6 Drawing Sheets

(56) References Cited

U.S. PATENT DOCUMENTS

| | | | |
|---|---|---|---|
| 2012/0164968 A1* | 6/2012 | Velusamy | H04W 4/22 455/404.2 |
| 2013/0049987 A1* | 2/2013 | Velusamy | G08G 1/0112 340/905 |
| 2013/0132286 A1* | 5/2013 | Schaefer | H04W 4/003 705/305 |
| 2014/0302810 A1* | 10/2014 | Inha | H04W 4/005 455/404.1 |

FOREIGN PATENT DOCUMENTS

| | | |
|---|---|---|
| CN | 202413685 U | 9/2012 |
| EP | 0649776 B1 | 4/1995 |

\* cited by examiner

MULTIFUNCTIONAL AIRBAG TRIGGERING SYSTEM

BACKGROUND OF THE INVENTION

Field of the Invention

The present patent application relates generally to the field of safely driving any type of automotive vehicles, and more particularly in adverse conditions when unforeseen accidents such as a crash or an overturning may eventually happen, creating therefore an urgency that must be overcome by means of preventive measures aimed to avoid additional consequences, such means including the broadcasting of an immediate general warning signal or message to all drivers and authorities located in the vicinities who could be somehow affected by those facts, being said general warning accomplished for instance by a dedicated set of electronic elements hooked up to vehicles that are capable to instantly generate computable signals and messages that are wirelessly transmitted immediately after the occurrence of the accident by using a proper and interactive communication device such as a transceiver, being the whole routine happening simultaneously to the deployment of airbags existing in those vehicles.

The Related Art

The airbags referred to in this patent application are similar to the ordinary type currently in use by the industry of vehicles, however fitted, according to the description herein presented, with means to actuate when required as a multifunctional airbag triggering system which, for the overall security of the drivers should be preferably embedded also in all nearby vehicles that are coming frontally or from behind in the same route where an accident involving one or more vehicles has just happened.

The so far existing patents fundamentally differ in at least two points when compared to the multifunctional airbag triggering system prescriptions.

Firstly, the operational routine of all of them comprises the use of a central intermediary point or entity that collect data directly from the existing information sources and thence transmit them all directly to final recipients namely the drivers.

Secondly, they use preselected and prerecorded recipients instead of an universal system which can be directly, instantly and randomly accessible by all drivers whose vehicles are fitted with the system of the present application.

For safety reason, the main goal of the present application is to put all drivers located in the same traffic area instantly aware that an airbag of one of those vehicles has been deployed in the proximity, which is a potential indication that said vehicle could be facing an emergency situation that requires all other related drivers full attention and immediate reduced speed in order to be prepared for a possible accident scenery ahead which might be firstly avoided and secondly reported to the authorities present in the vicinities.

DESCRIPTION

Among an assortment of pieces and devices used to build up a vehicle, it is a mandatory protocol for all car manufacturers the permanent search for a careful and progressive improvement of the safety items embedded to those vehicles once they are essential elements to be used whenever drivers are facing adverse driving conditions such as in night times, rainy or snowy conditions, uncomfortable circumstances when they receive the frontal or rearward glare of headlights from other cars, as well as when experiencing unforeseen circumstances such as a sudden accident in the lane.

To cope with almost all undesirable situations, drivers have already an array of resources loaded into the vehicles they usually manage.

Through the novelties it unveils, the present patent application specially refers to safety equipment of any sort existing in all kind of vehicles with the main objective of protecting drivers during the entire time they stay inside them.

Over the time, many evolutionary changes and introductions such as glued-in windshield, seat belts, last generation ABS brakes, GPG, airbags and many others have been added to this category.

Airbags for instance are nowadays of crucial importance for a safe driving and are usually located in strategic positions all over the vehicles for the best protection of the occupants including the driver, whenever an accident like a strong collision or a rollover happens.

This equipment, that has an inflation rate in less than a tenth of a second, was introduced in vehicles in the early of 1980s and since then has saved many people from suffering heavy injuries when involved in crash situations.

Therefore and for the purposes of submission of the present patent, airbags will be cited here as the support elements for the description and elaboration of the present novelty but it should be understood that they have been presented just by way of example only, without limitation, as well as any of the elements or materials associated with the patent presentation that may employ alternative functionality. Thus, the breadth and scope of a preferred embodiment should not be limited by any of the herein described exemplary embodiments.

As such, airbags are generally described as a safety equipment to be instantly activated through an automatic responsive system whenever the vehicle in which they are installed receives a relatively intense shock in its structure but strong enough to be instantly perceived by an accelerometer sensor also present, due to the sudden deceleration of that vehicle.

Airbags are basically formed by three distinct parts:

The first one is the bag itself that is usually made up of thin nylon fabric and folded into a shelter such as the steering wheel or the dash board.

The second one is an accelerometer sensor which purpose is to sense or detect some characteristic of its environs and provides a corresponding output, generally as an electrical or optical signal for accomplishment of some tasks ahead in a given system to which it belongs.

An important utilization of accelerometers is for airbag deployment systems because they are able to judge when two cars have struck each other and even ascertain the severity of the collision. That sensor normally can detect a collision force equivalent to a collision into a hard obstacle at 10 to 15 miles per hour.

The third part is the inflation system which inflates the bag very fast. This system uses a kind of solid rocket booster connected to a mechanical switch that is flipped when there is a mass shift that closes an electrical contact in reaction to the information received from the sensors that a crash has occurred causing the sodium azide (NaN3) and potassium nitrate (KNO3) to react very quickly to produce a large pulse of hot nitrogen gas inside the empty airbag.

As such, the airbag system ignites a solid propellant, which burns extremely rapidly to create a large volume of gas to inflate the bag. The bag then literally bursts from its storage site at up to 200 mph. A second later, the gas quickly dissipates through tiny holes in the bag, thus deflating the bag so passengers can move.

Based upon the airbag's example as above described, the exact moment when the sensors instantly react to the information received as from the impact received by the vehicle's structure is also the moment of main interest for the purpose of describing how the present patent will work.

A consequence of the present patent is therefore the creation of a communication network system among drivers and authorities through which a warning signal is instantly sent to all vehicles operating in the vicinities whenever an accident of major severity happens to one or more of those vehicles, aiming to prevent the sequential involvement of the related vehicles in the area, eventually in a chain-reaction crash.

By using the airbag system, as so far exemplified, a general warning signal will be simultaneously triggered by the same sensor that causes the airbag system to react. In this example, the airbag's sensor will be also connected and serving to a second electronic system that is the multifunctional airbag triggering system of the present patent.

By using the already existing airbag system for triggering the multifunctional airbag triggering system, as so far exemplified, the patent will be given the ability to dispatch a general warning signal that will be simultaneously triggered by the same sensor that stimulates the airbag system's reaction.

As described, the same airbag sensor will be also employed to simultaneously attend a second electronic system in its first operational stage that is the multifunctional airbag triggering system of the present patent.

In one of the various possible embodiments, the multifunctional airbag triggering system becomes operative with the support of electric power supplied either by the vehicle's central battery or even by a dedicated battery and comprises firstly an accelerometer sensor with the capacity to detect collisions into any selected portion of the vehicle's structure in a given intensity that may indicate that said vehicle has been hit by an important accident which, for safety reasons, must be of the immediate knowledge of any related vehicle, driver and authority crossing the same area.

After have been captured and processed by the accelerometer sensors, all positive data that may suggest an intense damage to the vehicle will be then passed on, wired or wirelessly, to the relays available in both systems that in the present example are one for the airbag system and the other for the multifunctional airbag triggering system.

Relay is a device that responds to small current or voltage change by activating switches or similar devices in a closed electric circuit. When activated by the relay, the switch of the present example moves the switch lever from "OFF" to the "ON" position, this simple and fast action causing the transmitter embedded in the transceiver to instant broadcasting a pre-recorded message or signal, eventually combined with the 2D position (latitude and longitude) of the occurrence ascertained by a GPS device, for example, aimed to be received by all other vehicles, drivers and authorities in the same area whose vehicles are equipped with a compatible and similar transceiver operating in the same frequency, such a receiver catching the broadcasted message or signal sent by the damaged vehicle.

The exchanging of message from one point to another, as above described, can be performed by a transceiver which is a device comprising both a transmitter and a receiver combined and sharing a common circuitry or any other proper equipment such as transponders, transverters, and repeaters, examples of similar devices.

Likewise, the accident alert may be broadcasted trough the most adequate means such as electromagnetic waves or any other viable media such as Infrared, Microwaves in the ISM band, FM, similar to Radio Data System (RDS), Data Radio Channel (DARC) or Radio Waves.

Upon receiving those broadcasted message, the drivers in the vicinity whose vehicles are equipped with the multifunctional airbag triggering system will be given an instant alert which may be in the shape of a blinking light, a voice message or any other sort of advice that will be displayed in the vehicle's panel for example, as better explained in FIG. 5, in such a way that for those drivers it will be given time enough to take the necessary precautions before getting visual contact with the accident scenery, therefore with time enough left to prepare themselves for not be involved in the same problem.

For those drivers who are passing by the accident scene but that were not directly involved in the accident, it has been created an alternative panic button close to his hands such as in the vehicle's panel or in the steering wheel, for example, for manually trigger an urgent general announcement to all nearby drivers via the same system hereby described, serving also this button to withdraw an involuntary or false warning alert sent.

OBJECTS OF THE INVENTION

It is therefore an object of the present patent application maintain all drivers located in the same region dully aware that an airbag of a certain vehicle has been deployed in the proximity which is a potential warning that said vehicle might be experiencing an emergency situation, requiring therefore from all other drivers full attention and immediate reduced speed in order to be prepared for an upcoming accident scenery that is to be firstly avoided and secondly reported to the authorities present in the vicinities.

It is also an object of the present patent application the creation of an electronic network between groups of drivers that are operating in the same traffic complex.

It is also an object of the present patent application the introduction of a system that, from one side aims to identify intense shocks to a vulnerable part of a vehicle's structure and that, from the other side is capable to timely transmit to a group of drivers operating in the same traffic complex alert advices about dangerous situations they might face somewhere ahead, through the use of combined elements such as but not limited to sensors, wired or wireless nets, relays, signal transmitting-receiving apparatus, antenna and any other.

It is also an object of the present patent application the introduction of a warning method that might put traffic authorities and rescue teams located at the vicinities of an accident instantly aware about the gravity and location of sudden traffic problems.

It is also an object of the present patent application the introduction of a warning method that will be permanently active and at drivers' full disposition both for transmitting or to receive alert messages whenever they are using said vehicles.

It is also an object of the present patent application the creation of an universal network for dynamic and straight communication between users whose involuntary participation is entirely shared among them at same instant time.

The way those objectives will be achieved are better explained through the following drawings.

Figure 1:
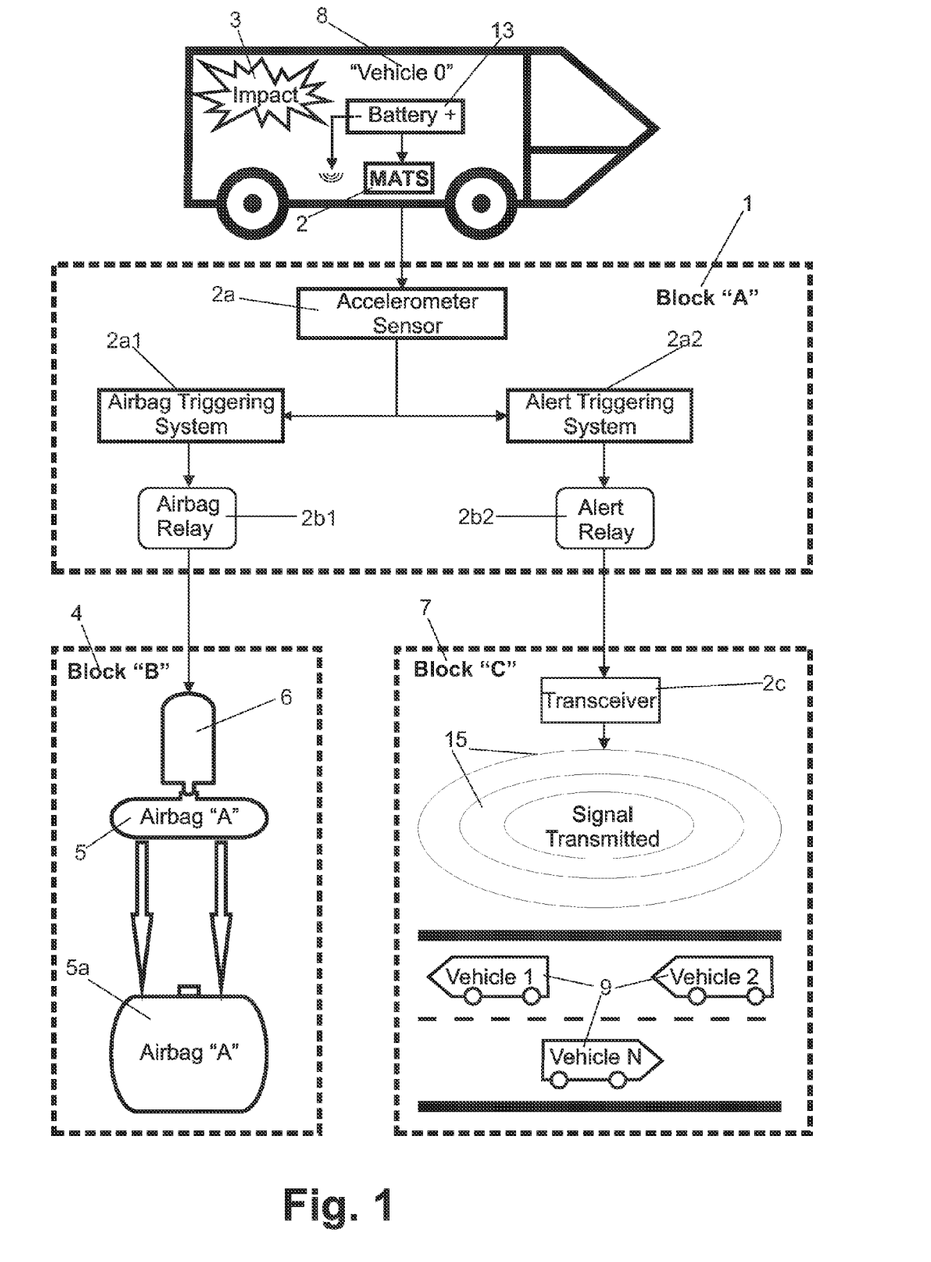
FIG. 1 shows the three main functioning blocks of the multifunctional airbag triggering system all together.

On FIG. 1, the multifunctional airbag triggering system was schematically divided in three blocks delimited by dashed lines, for better explanation of its functionalities when an impact (3) from the outside is detected by the accelerometer sensor.

Thus, Block "A" (1) comprises the primary stage of the multifunctional airbag triggering system, from now referred to as MATS (2), where two of the three main elements needed by the system are shown, i.e., the accelerometer sensor (2a) responsible for the activation of the two joint triggering systems namely the Airbag Triggering System (2a1), and the Alert Triggering System (2a2), and the two namely Airbag Relay (2b1) aimed to serve the inflation process of the airbag, and the Alert Relay (2b2) that is exclusively connected to the alert broadcasting set of the system, both relays (2b1) and (2b2) jointly responsible to perceive along with the accelerometer (2a) an impact (3) from outside to the vehicle's structure, as well as to pass it ahead as computable data.

Block "B" (4) shows the inflation process of the empty airbag (5) upon receiving a command from the relay (2b1) causing so the airbag's inflation unit (6) to react very quickly to produce a large pulse of hot nitrogen gas inside the empty airbag (5) till it gets fully loaded (5a).

And Block "C" (7) that discloses how the relay (2b2) activates the transceiver (2c) to broadcast a written or oral 360° peripheral warning message such as "ATTENTION—AIRBAG DEPLOYED NEARBY" which will be received by all vehicles that are fitted with MATS (2) and located within a certain distance from the accident but close enough to have sufficient time for taking precautionary measures.

Figure 5:
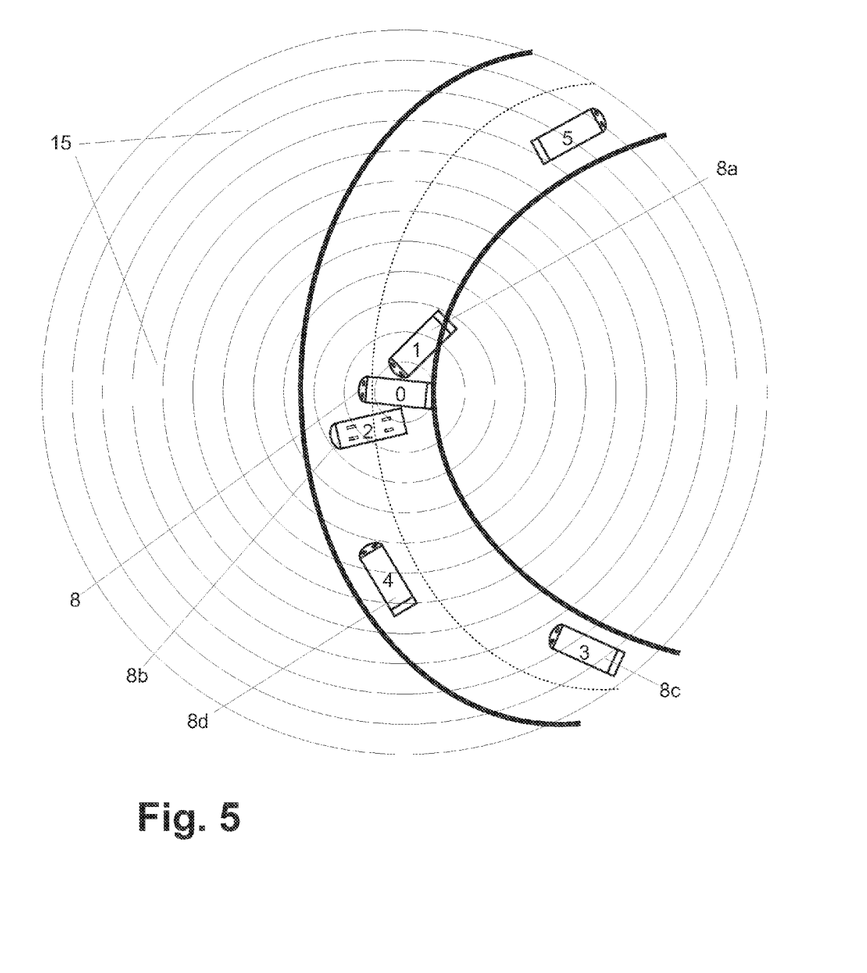
FIG. 5 shows a general view of a road in a crash situation.

On FIG. 1, therefore, when the "VEHICLE 0" (8) that is fitted with MATS (2) and that supposedly has entered in an emergence situation, as exemplified in FIG. 5, the warning process of spreading out an alert about the urgent situation suddenly created will start for all recipient vehicles (9) that are also equipped with MATS (2).

Recipient vehicles (9) in the present illustration are represented by "VEHICLE 1" up to "VEHICLE N" which supposedly are the vehicles located in the surroundings of the accident involving "VEHICLE 0" (8) and that, as they are also fitted with MATS (2), will consequently capture the message or signal sent by the transceiver (2c) existing in "VEHICLE 0" (8).

All those recipient vehicles (9) are located in a point of the lane from where it is impossible by any reason for their drivers to get visual contact with the accident scene, as illustrated on FIG. 5.

But notwithstanding of this restriction, they will be close enough to be reached by the wireless message (15) sent by the MATS (2) existing in "VEHICLE 0 (8)", having therefore time enough to prepare themselves to take all precautionary measures required in such an urgent situation.

Figure 2:
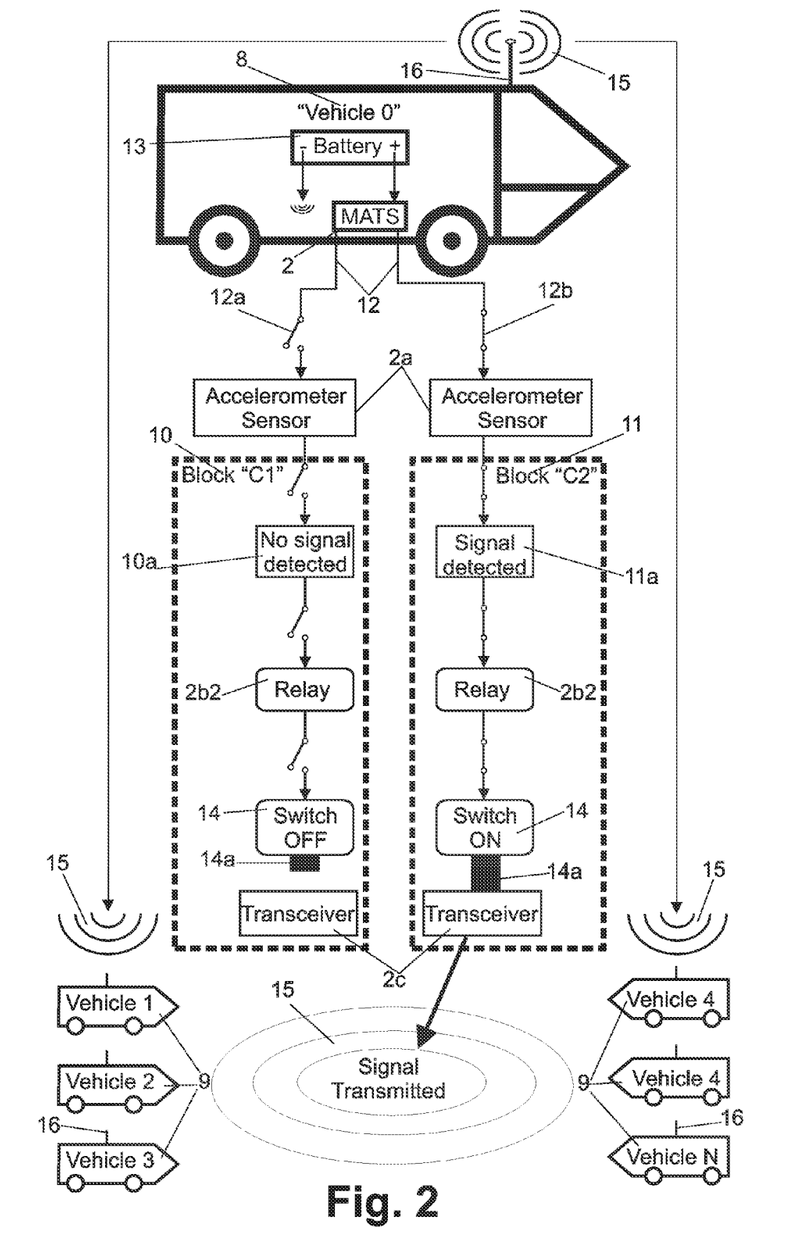
FIG. 2 shows only the phase for broadcasting a warning message.

FIG. 2 depicts two flowcharts comprising only the broadcasting stage of MATS (2) in the two possible situations. In the present example therefore, the broadcasting function of MATS (2) is subdivided in two blocks to illustrate how it moves from the idle phase shown in Block "C1" (10), to the actuating phase shown in Block "C2" (11).

On Block "C1" (10) that illustrates the idle phase of the system when there is no accident to be reported to "VEHICLE 0" (8), all the electric circuits (12) through which the electricity from the vehicle's battery (13) is transferred up to the switch (14) are open (12a), causing the switch (14) to stay motionless, without any actuation of its lever (14a) over the transceiver (2c).

The inverse situation however is observed on Block "C2" (11) by which the complete broadcasting routine for spreading an alert message is accomplished due to the perception by the accelerometer sensor (2a) of an intense impact (3) to "VEHICLE 0" (8).

In this case it is noted that all electric circuits (12) were closed (12a) due to the passage of an electric pulse sent by the accelerometer sensor (2a) up to the switch (14) that has also reacted by closing its electric connection with the transceiver (2a) through the lever (14a) which instantly started spreading a 360° alert warning around.

As such, a comprehensive view of the actuation routine of the multifunctional airbag triggering system is disclosed on Block "C2" of FIG. 2, since the moment of a clash to a given vehicle up to the announcement of this accident to all drivers in the vicinities.

Thus, the first step for triggering the whole system starts when an accident of moderate to intense gravity happens in a certain point of the route to a given vehicle, in this example represented by "VEHICLE 0 (8)", either due to a collision between one or more vehicles, objects or animals, or even when a rollover of a vehicle happened in the lane, provided that at least one of those vehicles involved in the accident is fitted with the MATS (2).

From one side, there will be the stimulation of the airbag system which will cause the airbags to be instantly inflated, aiming to protect the vehicle's occupants from grave injuries.

And from the other side, the operational routine conceived for broadcasting instant messages aimed to keep drivers alert in advance will start whenever a potential risk to them at any point of the route is detected, being the above mentioned routine commonly triggered by the airbag triggering system.

Once the multifunctional airbag triggering system was set in motion as from the accelerator sensor (2a) with electric power supplied by the vehicle's battery (13) or even by an independent dedicated battery, the related relay is immediately activated aiming to change from "OFF" to "ON" the lever (14a) position of the switch command (14) conjugated to the transceiver (2c), causing the prerecorded message to be instantly transmitted to all nearby drivers, remotely and wirelessly in the format of an audible signal, a written message or of any other sort, when there is still no visual contact between them and the accident scene.

In the Block "C2" of the flowchart shown on FIG. 2 therefore, the emitting VEHICLE 0" (8) is fitted with MATS (2), an antenna (16) and uses the assistance of the vehicle's battery (13) to broadcast warning messages to all nearby recipient vehicles (9).

Block "C2" exposes therefore the steps to be followed by MATS (2) to broadcast wireless warning messages (15)

through the antenna (16), right after an accident has happened to the emitting "VEHICLE 0" (8).

In this case, all electric elements of MATS (2) are instantly activated when the accelerometer sensor (2a) perceives an intense impact (3) to the vehicle's structure forcing the electric circuit (12) existing between the sensor and the relay to be immediately closed (12b) to permit the passage of an electric pulse addressed to the broadcasting relay (2b2) and thence to the switch (14) as an order to move its lever (14a) from "OFF" to the "ON" position, triggering therefore the broadcasting of the alert message to all recipient vehicles (9).

In accordance with the fundaments of the patent, the above described routine is to be entirely performed simultaneously to the triggering process of the airbag for the protection of the passengers on "VEHICLE 0" (8) meaning that there will be a common and simultaneous reaction in both systems.

Figure 3:
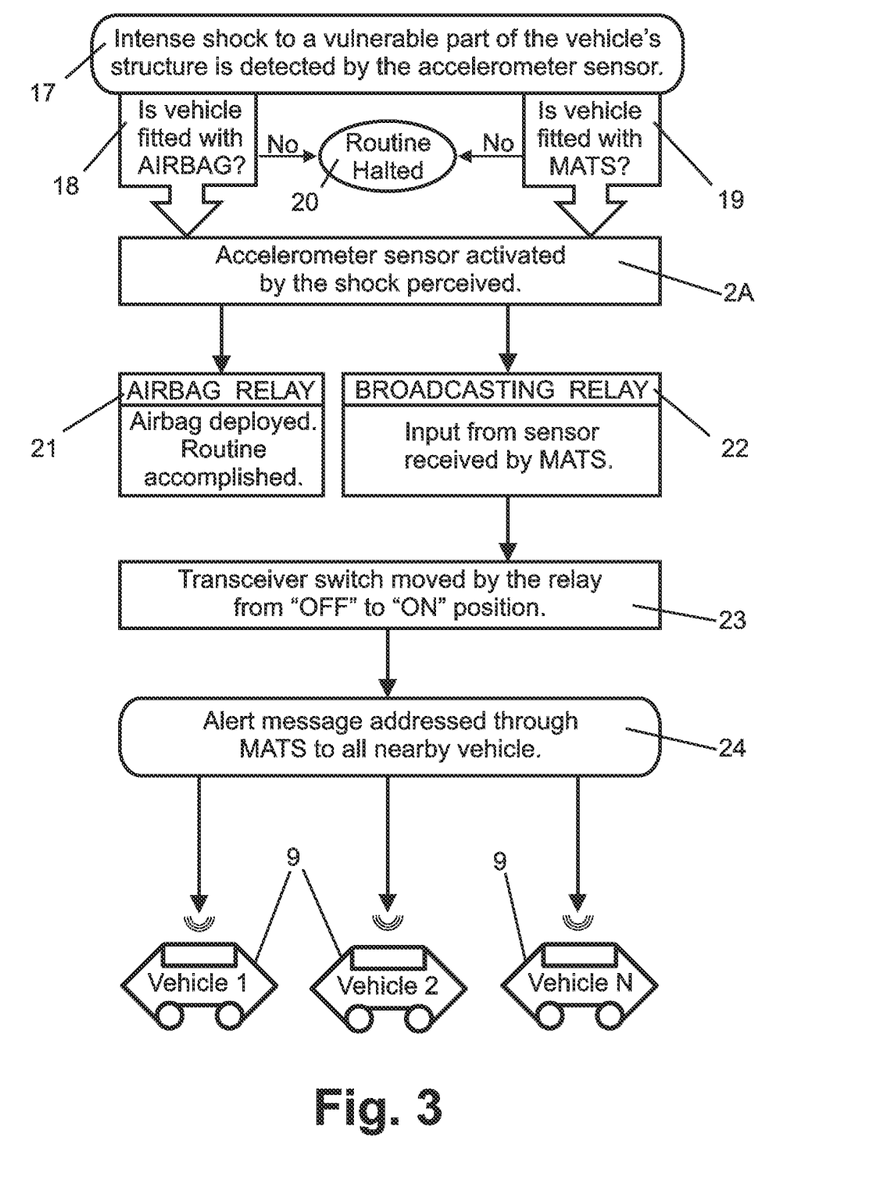
FIG. 3 shows a schematic overview comprising the principles of the present system.

Through the algorithm outlined in FIG. 3, an overview on the principles by which the system was conceived to be operative is described.

According to the step (17) a vehicle was hit by an intense shock in its structure leading to enquire whether the vehicle is equipped with Airbag Automatic Deployment System, on step (18) or the Multifunctional Airbag Triggering System—MATS (2), on step (19).

If the answer for both systems is "NO", then they go to an end and are halted, as in step (20).

If otherwise the answer is "YES" which means that the vehicle is fitted with Airbag Automatic Deployment System and with the Multifunctional Airbag Triggering System—MATS (2), the accelerometer sensor (2a) is instantly activated to capture the shock perceived and simultaneously pass it on ahead in the format of computable data as follows:

To the airbag's relay, as on step (21), which will cause the airbag to be instantly deployed and filled in to protect the vehicle's occupants from injuries, when this routine is considered fully accomplished;

To the broadcasting relay, as on step (22), and thence to the switch on step (23) that by means of its movable lever, will turn on the transceiver (2c) that will be able to spread out around to all recipient vehicles (9) fitted with MATS, a prerecorded alert message as on step (24).

Figure 4:
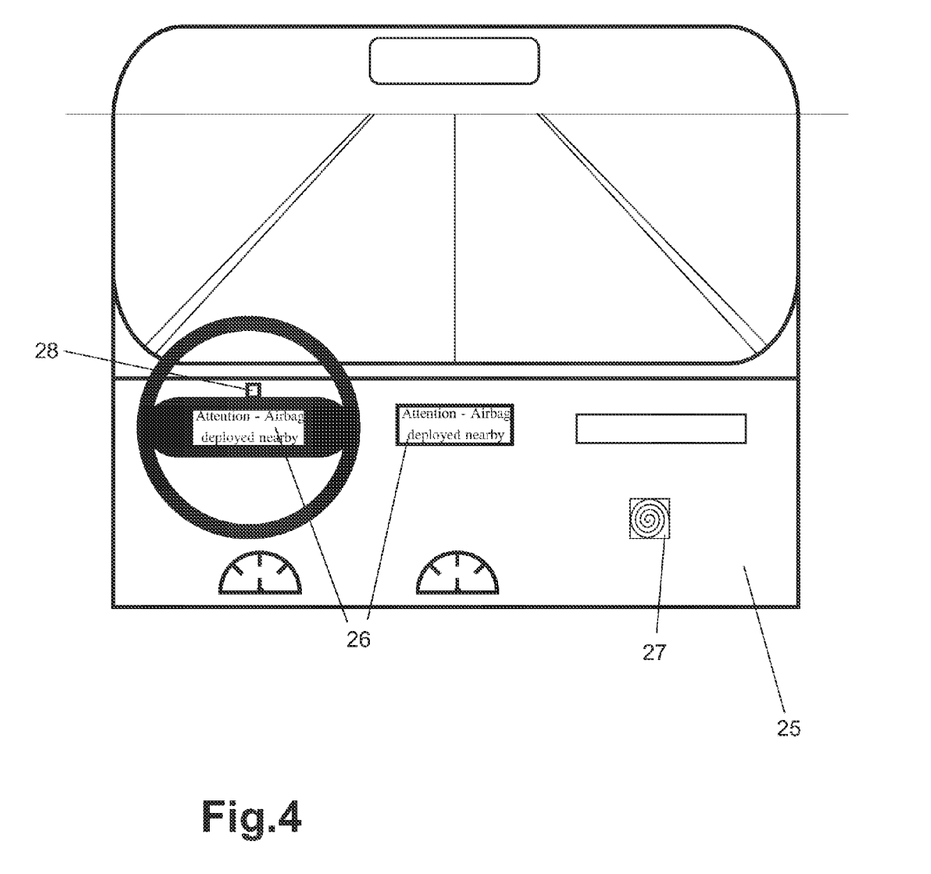
FIG. 4 shows the vehicle's panel from inside.

On FIG. 4 a frontal view of the vehicle's panel (25) is given, in which the operational interface between the vehicle's occupants and the MATS (2) is represented, including firstly a screen (26) in which the alert messages sent in writing and orally ratified will appear and that preferably should be located in an easy visual position for the driver, such as "ATTENTION—AIRBAG DEPLOYED NEARBY".

That message might also include the vehicle's position where the accident happened, plotted by GPS technology, pre-recorded information such as identification of the driver or the vehicle or any other desired.

Secondly, a speaker (27) that can be commonly shared with the vehicle's own sound system and capable to reproduce the message sent.

And thirdly a button (28) close to the driver's hands through which the driver can either interfere and cancel an unintentional alert message wrongly broadcasted when actually he has not suffered any accident, or even manually replicate an alert warning coming from injured drivers and that was sent via the MATS (2), in the event that he has not been involved in a crash but is momentarily passing by the accident scene.

Upon receiving those broadcasted message, the drivers in the vicinity whose vehicles are equipped with MATS (2) will be given an immediate advice which may be in the shape of a blinking light, a voice message or any other sort of advice that will be displayed in their vehicle's panel (25) for example, as better explained in FIG. 4, in such a way that those drivers will be given time enough to take the necessary precautions before getting visual contact with the accident.

To be transmitted remotely and wirelessly, the signal must be sent from the transmission point to the receiving point via the proper carrier type.

Wireless communication generally refers to the transfer of information between various transmitting and receiving remote points not connected by cables and is usually made via radio waves, reaching distances that may vary from meters to kilometers and encompasses many types of fixed, mobile and portable devices including wireless networking.

Radio waves will be used here just as an exemplary tool for better explanation of the present patent's fundaments, without any limitation for the use of any other plausible method that could be employed to make the patent workable, just like in situations that justify the use of wireless technology to link portable or temporary workstations, or to remotely connect mobile users and networks, for instance.

Thus, any other technologies that might be available by the state of the art such as but not limited to electromagnetic wireless communication or any other wireless services performed by wireless equipment that might include, for example infrared and ultrasonic devices, LMR—Land Mobile Radio, cellular and pagers which provide connectivity for portable and mobile applications, Global Positioning System (GPS) which is a position detecting circuit that allows drivers of all kind of vehicles to ascertain their location anywhere on earth are also included in the scope of the present patent under submission.

Figure 6:
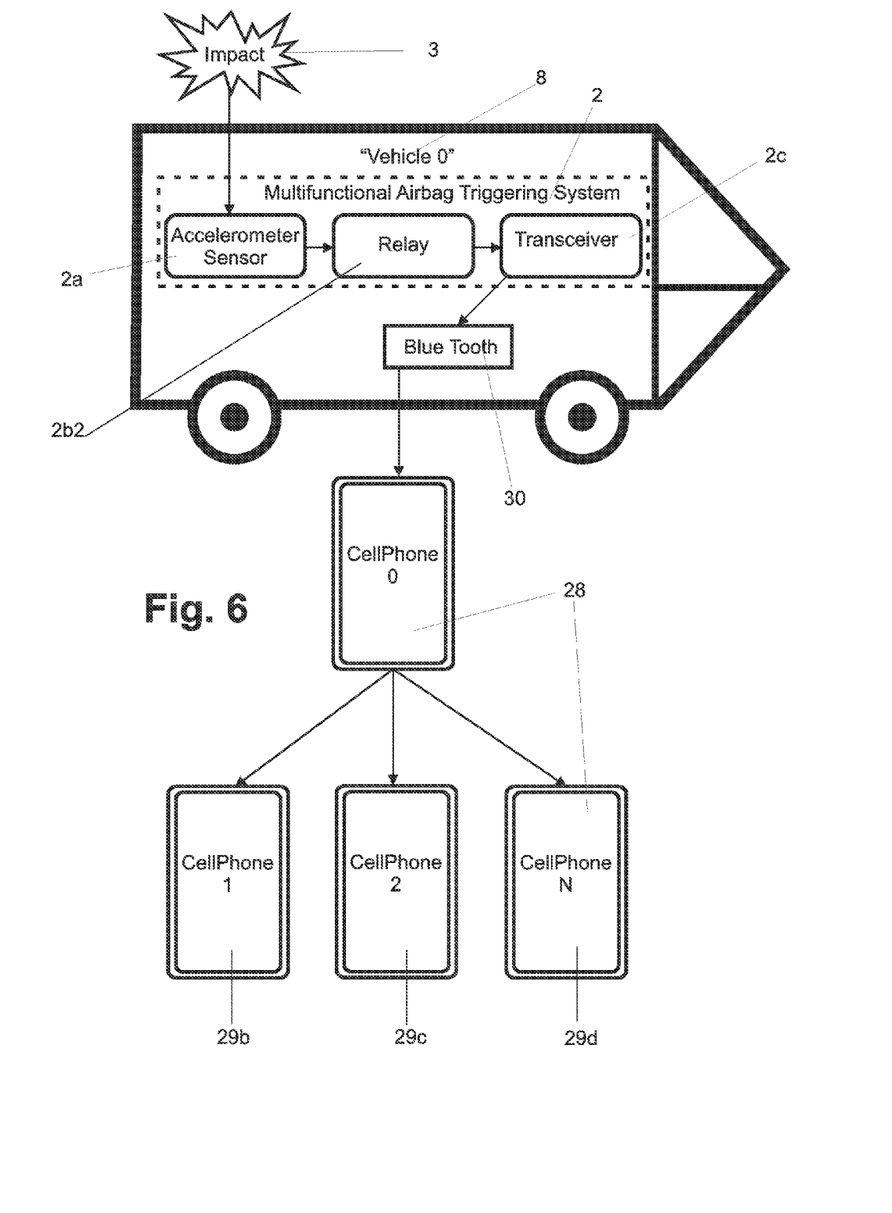
FIG. 6 shows an optional method to send the alert via smartphones.

One of the best-known examples of wireless technology is the mobile phone that is largely spread out all over the places and routes, and that uses radio waves to enable their users to make phone calls from many locations worldwide, which is better elaborated in FIG. 6.

On FIG. 5 a general view of a roadway in an accident situation is given, wherein "VEHICLE 0" (8) suffered a rollover and subsequently has been hit by "VEHICLE 1" (8a) and "VEHICLE 2" (8b), consequently closing both ways of the road for the traffic, exposing therefore VEHICLE 3" (8c) and "VEHICLE 4" (8d) of being involuntarily involved in a possible chain-reaction crash that could be possibly avoided if they had received beforehand a 360° alert message from "VEHICLE 0" (8) triggered by the onboard multifunctional airbag triggering system—MATS (2).

On FIG. 6, similarly to the alert warning process already disclosed above by the present patent, the MATS (2) can be used combined with the mobile telephone (28) and within the range reached by them aiming to send urgent alert messages or signals, whenever a risk situation is faced by one of said drivers.

Cellular data service offers coverage within a range of 10-15 miles from the nearest cell site and may be used when MATS (2) is not available in a nearby recipient vehicle.

If however the driver of "VEHICLE 0" shown on FIG. 6 is carrying the "cell phone 0" (28) fitted with Bluetooth (30) technology, and if "VEHICLE 0" is also fitted with the same facility, then it will be possible the exchanging of data between MATS (2) and the "cell phone 0" (28) which will relay the received data to all cell phones in the vicinity that on FIG. 6 are "CELL PHONE 1" (29b), "CELL PHONE 2" (29c) and "CELL PHONE N" (29d).

In this case, a dedicated digital software application to properly process the addressed messages should be loaded to the smart mobile phones (28) being used by the drivers in the moment of an eventual accident when the impact (3) to the vehicle's structure will be instantly informed by the multifunctional airbag triggering system to the relate smart phone.

At this point it is worth to state that the airbag system is being used just as an example to describe the present patent just because its similar fundaments to the multifunctional airbag triggering system functionalities are useful for this aim due to the fact that airbag system is already known not only by those skilled in the art but also by regular people who are using them since many years.

It must be noted therefore that the multifunctional airbag triggering system can also exist independently, to accomplish the same objectives described herein, being its synergy with the airbag system viable and even desirable mainly as a matter of economic and engineering efficiency.

I claim:

1. A multifunctional airbag triggering system comprising: use of the regular triggering systems currently used to activate vehicular airbags through which a warning signal is exchanged from a first vehicle directly to each of a plurality of vehicles operating in vicinities of the same traffic complex whenever an accident that potentially can result in a chain-reaction crash of major severity happens to at least one of said plurality of vehicles, and the simultaneous triggering of a wireless alert to all drivers of said plurality of vehicles and authorities operating in vicinities of the same traffic complex regarding the occurrence of a sudden airbag deployment.

2. A multifunctional airbag triggering system as recited in claim 1 wherein the simultaneous triggering of wireless alert to all drivers of said plurality of vehicles and authorities operating in said vicinities of the same traffic complex is accomplished with reference to computable data generated by an accelerometer of the regular airbags triggering system.

3. A multifunctional airbag triggering system as recited in claim 1 further comprising broadcasting facilities configured to spread out said warning signal operative to announce that an unequivocal urgency is now in force somewhere in said vicinities of the same traffic complex.

4. A multifunctional airbag triggering system as recited in claim 1 wherein said warning signal is sent through a direct, exclusive and dedicated communication network instantly and directly created upon an accident, said warning signal being sent between said first vehicle and all others of said plurality of vehicles and authorities operating in said vicinities of the same traffic complex, all of said plurality of vehicles engaged in a dedicated broadcasting exclusive preventive system.

5. A multifunctional airbag triggering system as recited in claim 1 wherein the system is configured to instantly generate computable signals and messages that are wirelessly transmitted immediately after the occurrence of an accident.

6. A multifunctional airbag triggering system as recited in claim 1 wherein said warning signal is generated by a dedicated set of electronic pieces hooked up to at least said first vehicle and includes at least a battery, an accelerometer sensor, a switch, a transceiver, a screen, an antenna, a manual button control, a speaker and a dedicated wireless net.

7. A multifunctional airbag triggering system as recited in claim 1 wherein said wireless alerts generated by the system are received by correspondent ones of said plurality vehicles fitted with the present system in the format of at least one of a blinking light, a written or voice message or any other means accessible by the driver.

8. A multifunctional airbag triggering system as recited in claim 1 wherein said wireless alerts further comprise messages are announced inside a recipient vehicle of said plurality of vehicles through at least one of a speaker, screen, or blinking light.

9. A multifunctional airbag triggering system as recited in claim 1 further comprising a panic button disposed in proximity to the driver's hands and configured to, upon pressing said panic button, manually replicate a wireless alert and cancel an unintentionally broadcasted wireless alert.

10. A multifunctional airbag triggering system as recited in claim 1 wherein said wireless alerts are transmitted via mobile cell phones preconfigured with software operative to further receive said wireless alerts and facilitate messages announced inside a recipient vehicle of said plurality of vehicles.

11. A multifunctional airbag triggering system as recited in claim 1 wherein the broadcasting of said warning signal occurs simultaneously to the airbag deployment of said first vehicle.

12. A multifunctional airbag triggering system as recited in claim 1 further comprising computable data collected by the system directly from generating sources of the regular airbags triggering system and transmitted directly to all of the drivers of said plurality of vehicles.

13. A multifunctional airbag triggering system as recited in claim 1 wherein said wireless alert is operative to inform each driver of said plurality of vehicles of the accident, prior to visual contact by a driver of the accident.

14. A multifunctional airbag triggering system as recited in claim 1 wherein said warning signal includes data associated with a position of said first vehicle.

15. A multifunctional airbag triggering system of a vehicle comprising:
    an alert triggering system at least partially disposed in electrical communication with an airbag triggering system of the vehicle;
    said alert triggering system configured to broadcast an alert message directly to each of a plurality of other vehicles; and,
    said alert triggering system further configured to broadcast said alert message upon activation of said airbag triggering system.

16. The multifunctional airbag triggering system of a vehicle as recited in claim 15 wherein said alert triggering system is further disposed in electrical communication with an accelerometer sensor of the airbag triggering system of the vehicle.

17. The multifunctional airbag triggering system of a vehicle as recited in claim 16 wherein said alert message is broadcast concurrent to generation of an electrical signal by said accelerometer sensor sufficient to activate the airbag triggering system of the vehicle; said electrical signal activating a relay of said alert triggering system.

18. The multifunctional airbag triggering system of a vehicle as recited in claim 15 wherein said alert message is broadcast directly from a first vehicle to each other vehicle of said plurality of vehicles.

19. The multifunctional airbag triggering system of a vehicle as recited in claim 15 wherein said alert message is broadcast from a mobile device disposed within said first vehicle directly to at least one other mobile device disposed in each of said plurality of vehicles.

20. The multifunctional airbag triggering system of a vehicle as recited in claim 19 wherein said alert message is broadcast concurrent to generation of an electrical signal by said accelerometer sufficient to activate the airbag triggering system of the vehicle.

* * * * *